United States Patent
Bruske et al.

(10) Patent No.: US 10,858,771 B2
(45) Date of Patent: Dec. 8, 2020

(54) DEVICE AND METHOD FOR PRODUCING A CARRIER PART HAVING A PLURALITY OF FIBER BUNDLES

(71) Applicant: Groz-Beckert KG, Albstadt (DE)

(72) Inventors: Johannes Bruske, Albstadt (DE); Daniel Winterholer, Albstadt (DE)

(73) Assignee: Groz-Beckert KG, Albstadt (DE)

(*) Notice: Subject to any disclaimer, the term of this patent is extended or adjusted under 35 U.S.C. 154(b) by 0 days.

(21) Appl. No.: 16/754,429

(22) PCT Filed: Oct. 2, 2018

(86) PCT No.: PCT/EP2018/076810
§ 371 (c)(1),
(2) Date: Apr. 8, 2020

(87) PCT Pub. No.: WO2019/072641
PCT Pub. Date: Apr. 18, 2019

(65) Prior Publication Data
US 2020/0318274 A1 Oct. 8, 2020

(30) Foreign Application Priority Data
Oct. 10, 2017 (EP) ..................... 17195790

(51) Int. Cl.
*D05C 15/18* (2006.01)
*B29C 70/24* (2006.01)
(Continued)

(52) U.S. Cl.
CPC ............ *D05C 15/18* (2013.01); *B29C 70/086* (2013.01); *B29C 70/24* (2013.01); *D05C 17/023* (2013.01)

(58) Field of Classification Search
CPC .............. D05C 15/00–38; D05C 17/02; D05C 17/023; D05C 17/026; B29C 70/12; B29C 70/14; B29C 70/24; B29C 70/086
See application file for complete search history.

(56) References Cited

U.S. PATENT DOCUMENTS 2,814,301 A * 11/1957 Schmitz ............... A41G 5/0006
132/201
3,595,185 A * 7/1971 Shorrock ............... D05C 15/18
112/80.08
(Continued)

FOREIGN PATENT DOCUMENTS

DE  2025915 A1  12/1971
DE  2307490 A1   8/1974
(Continued)

OTHER PUBLICATIONS

European Extended Search Report dated Apr. 9, 2018, in corresponding European Application No. 17195790.5, with English translation (6 pages).
(Continued)

*Primary Examiner* — Ismael Izaguirre
(74) *Attorney, Agent, or Firm* — Fitch, Even, Tabin & Flannery LLP (57) ABSTRACT

A device and a method for producing a carrier part having a plurality of fiber bundles. At least one fiber bundle strand is removed from a supply with a fiber bundle conveying unit and is conveyed into its own feed channel. A suction channel associated with each feed channel is fluidically connected thereto. An air flow is generated in the suction channel, and an end portion of the at least one fiber bundle strand is conveyed into the suction channel. By moving the at least one suction channel into a working position, the end portion of the at least one fiber bundle strand is free in a working region of the device. A needle unit having at least one needle
(Continued)

can pick up the end portion in the working region and can pull or push it through a carrier part as the needle unit moves through the carrier part.

16 Claims, 10 Drawing Sheets (51) Int. Cl.
   *D05C 17/02* (2006.01)
   *B29C 70/08* (2006.01)

(56) References Cited

U.S. PATENT DOCUMENTS

| | | | | |
|---|---|---|---|---|
| 3,757,715 A | * | 9/1973 | Spanel | D05C 15/20 |
| | | | | 112/221 |
| 3,812,799 A | * | 5/1974 | Spanel | D05C 15/20 |
| | | | | 112/80.07 |
| 3,824,939 A | * | 7/1974 | Spanel | D05C 15/24 |
| | | | | 112/80.07 |
| 3,931,098 A | | 1/1976 | Herweg et al. | |
| 3,937,156 A | * | 2/1976 | Spanel | D05C 15/00 |
| | | | | 112/80.07 |
| 4,549,496 A | * | 10/1985 | Kile | D05C 15/34 |
| | | | | 112/80.08 |
| 2009/0252917 A1 | | 10/2009 | Weber et al. | |
| 2010/0236212 A1 | | 9/2010 | Weber et al. | |
| 2010/0263504 A1 | | 10/2010 | Rippert et al. | |
| 2016/0263841 A1 | | 9/2016 | Endres et al. | |
| 2017/0284005 A1 | | 10/2017 | Endres et al. | |
| 2017/0320290 A1 | | 11/2017 | Endres et al. | |

FOREIGN PATENT DOCUMENTS

| | | |
|---|---|---|
| DE | 102005024408 A1 | 11/2006 |
| DE | 102006056570 B3 | 4/2008 |
| DE | 102007033869 A1 | 1/2009 |
| DE | 102007055684 A1 | 6/2009 |
| DE | 102009050904 A1 | 4/2011 |
| DE | 102013111794 A1 | 4/2015 |
| DE | 102014015976 A1 | 5/2016 |
| DE | 102015110855 A1 | 1/2017 |
| EP | 0736618 B1 | 1/1999 |
| GB | 2159460 A | 12/1985 |
| WO | 92/00845 A1 | 1/1992 |
| WO | 2008/111997 A1 | 9/2008 |
| WO | 2014/086786 A1 | 6/2014 |
| WO | 2016/059110 A1 | 4/2016 |
| WO | 2016/092194 A1 | 6/2016 |

OTHER PUBLICATIONS

International Search Report and Written Opinion dated Jan. 18, 2019, in corresponding International Application No. PCT/EP2018/076810, with English translation (16 pages).

* cited by examiner

DEVICE AND METHOD FOR PRODUCING A CARRIER PART HAVING A PLURALITY OF FIBER BUNDLES

CROSS REFERENCE TO RELATED APPLICATIONS

This patent application is the national phase of PCT/EP2018/076810, filed Oct. 2, 2018, which claims the benefit of European Patent Application No. 17195790.5, filed Oct. 10, 2017.

TECHNICAL FIELD

The invention refers to a device and to a method for producing a carrier part comprising multiple fiber bundles. Particularly the carrier part can be a light-weight construction carrier part, e.g. a carrier part made of a foamed material. The fiber bundles can be immersed with a plastic material, e.g. a resin, in order to obtain a composite component.

BACKGROUND

Such a carrier part comprising a fiber bundle is known from DE 10 2005 024 408 A1. For manufacturing, a hole is introduced in the carrier part first, in order to subsequently pull the fiber bundle through the introduced holes. For this a needle is used. Such a method is also known from WO 2014/086786 A1 and DE 10 2014 015 976 A1.

DE 10 2006 056 570 B3 describes a sewing device for pulling such fiber bundles in a carrier part. The sewing device comprises particularly a needle with an eyelet that can be opened or closed at one location respectively by means of a movable needle part.

WO 2016/059110 A1 refers to a device as well as a method for providing of reinforcing skein loops that can be pulled through a carrier part. For this a profile body with clamps for fixing a fiber skein is provided. The fiber skein that is fixed at its free end at the profile body and is released apart therefrom, is formed to a loop by means of a slide and is cut in a desired length by means of a separation device after formation of the loop. Then the loop can be pulled through the carrier part by means of a needle.

A device and a method for pulling of loops through a carrier part is described in DE 10 2007 055 684 A1. There a fiber skein is supplied by means of rollers of a reception device. The reception device is subsequently moved by means of a slide linearly and parallel to a longitudinal direction of the fiber skein until a gap of the reception device placed in the middle of the fiber skein section between its free end and a separation device. A needle is moved through the carrier part into the gap, catches the fiber skein and pulls it through the carrier part.

A device in which a fiber skein is placed around a needle punctured through the carrier part by means of a rotatable device is described in DE 10 2009 050 904 A1. Subsequently the needle can be retracted and can be pulled through the carrier part under formation of a loop. Similar devices in order to insert a fiber bundle skein in a needle hook of a needle are known, for example, from DE 10 2007 033 869 A1, as well as DE 10 2013 111 794 A1.

DE 2 025 915 A1 describes a method for distribution of reinforcing material in form of glass fibers during manufacturing of plastic parts. In doing so, a roving 17 is carried in an air stream of pressurized air and its individual ends are dissolved and the dissolved individual fibers are blown onto perforated sheet metal. At the opposite side of the perforated sheet metal air is sucked in order to achieve sticking of the fibers at the perforated sheet metal. Subsequently a plastic coating can be applied. A similar method is also described in DE 2 307 490 A.

EP 07 36 618 B1 describes the supply of a fiber band into the clamping line of calender discs of a fiber band processing textile machine. By means of guiding air the fiber band is threaded through the calender gap and subsequently a calender disc can be infeeded, in order to clamp the threaded fiber band. In the method known from DE 10 2015 110 855 A1 rovings are conveyed onto a conveyor belt and are retained at the conveyor belt by means of underpressure.

Starting from the described prior art it can be considered as object of the present invention to provide a device and a method to make the manufacturing of a carrier part comprising multiple fiber bundles more efficiently.

SUMMARY

The object is solved by a device as well as a method as described herein.

The device comprises a fiber bundle conveying unit that is configured to remove at least one fiber bundle skein from a stock. At least one supply channel is present, in which one fiber bundle skein can be conveyed by means of the fiber bundle conveying unit respectively. The device also comprises at least one suction channel that is fluidically connected with a suction unit. By means of the suction unit an airflow can be created in the at least one suction channel that is particularly directed away from the end of the suction channel opposite from the suction unit.

The at least one suction channel is movable between an initial position and a working position, preferably linearly in a longitudinal direction. In the initial position the at least one suction channel is located in a working area of the device. In the initial position each present suction channel is fluidically connected with one assigned supply channel respectively. If an airflow is created in the initial position, an underpressure is created in the supply channel that sucks an end section of the fiber bundle skein present in the supply channel. In this initial position predefined length of the fiber bundle skein can be conveyed by the fiber bundle conveying unit that extends into the suction channel.

The at least one suction channel can be moved out of the working area into a working position. In the working position it is positioned with distance to the respectively assigned supply channel. In this working position the airflow is maintained. In doing so, the end section of the fiber bundle skein present in the working position is subject to a suction force and extends outside of the suction channel and the supply channel at least in a section freely accessible through the working area.

The device also comprises a needle holding unit with at least one needle arranged thereon. Each needle has a needle hook. By means of the needle holding unit the at least one needle can be moved between a retracted position and an extended position. Due to this movement, each needle can engage at the assigned fiber bundle skein in the working area and due to the movement of the needle, the fiber bundle skein can be moved under formation of a loop through the carrier part. Each needle is moved between the extended position and the retracted position along its longitudinal axis. Preferably multiple needles are present and all longitudinal axes are arranged in the same common plane.

By means of this device a plurality of needles can be arranged at the needle holding unit with low distance. In a corresponding distance the fiber bundle skeins can be arranged in the working area adjacent to each other. The providing and supplying or conveying of the individual fiber bundle skeins requires low space transverse to the longitudinal direction. Depending from the size of the carrier part and the desired distance of the fiber bundles that are to be introduced in the carrier part, very high fiber bundle densities can be very efficiently created in the carrier part.

The longitudinal direction means the direction in which a straight line extends through the working area that connects the openings facing each other of the at least one supply channel and the respectively assigned suction channel. The at least one fiber skein is orientated in the working area in longitudinal direction between the at least one supply channel and the respectively assigned suction channel as long as it is not engaged by the needle or a guide device transverse to the longitudinal direction.

The device can comprise a control device in order to control the individual drives or the individual units of the device, particularly the needle holding unit, the suction unit, a drive for moving the at least one suction channel, the conveying unit and additional drives or units as an option. The control device is particularly configured to carry out the described method.

The device preferably comprises a positioning unit. The positioning unit is configured to move the carrier part particularly stepwise in a transport direction or to position it in this direction. The transport direction is orientated parallel to the longitudinal direction.

In doing so, it is advantageous, of the positioning unit is arranged between the working area and the needle holding unit. Thus, the needle holding unit can be located outside of the working area and with view from the positioning unit at the opposite side of the working area. In this configuration the fiber skeins are pulled by means of the respective needle through the carrier part. Alternatively to this it is also possible to arrange the needle holding unit in the working area and to push the at least one fiber skein by means of the respective needle through the carrier part.

In a preferred embodiment the fiber bundle conveying unit has a roller arrangement with, e.g. at least two rollers. By driving one or both rollers the at least one fiber bundle skein can be conveyed by a defined length. The fiber bundle conveying unit can, e.g. detect the rotation position of a roller or of a part rotatably coupled therewith and determine the respective conveyed length of the fiber bundle skein therefrom.

It is also advantageous, if a guide unit having a guide device is provided. The guide device is arranged in the working area. The guide device comprises a separate guide passage for each provided fiber bundle skein. In doing so, one respective fiber bundle skein can be guided through an assigned guide passage for guidance.

It is preferred that the at least one suction channel extends in its initial position through one guide passage of the guide unit respectively. After supplying of the end section of the fiber bundle skein in the suction channel and the retraction movement of the suction channel in its working position the respective portion of the fiber bundle skein is threaded through the guide passage. By means of the guide device the fiber bundle skein can be moved or positioned transverse to its longitudinal direction in the working area.

It is also advantageous, if the guide device comprises two guide bodies. The two guide bodies are arranged with distance to each other under formation of an interstice in the range of the guide passage. The interstice separates the guide passage in two guide holes aligned with each other. Each of the guide holes extends through one of the two guide bodies in the longitudinal direction. The interstice can be provided and configured to receive a free end of an assigned needle in order to hook the respective fiber bundle skein in the needle hook. For example, the guide bodies are integrally formed and can be formed by a plate-like part respectively. In a preferred embodiment the at least one guide passage is always completely closed in circumferential direction, wherein the feeding of the fiber bundle skein is carried out by the at least one suction channel.

It is also advantageous, if the guide unit is configured to move the guide device along a predefined path. This path extends parallel to a plane that is orientated orthogonal to the longitudinal direction. The path is particularly configured as closed and at least in sections curved path. For example, a path can have a circular and/or elliptic and/or another arbitrary at least in sections curved shape. Due to the movement of the guide device along the path, the at least one fiber bundle skein is also moved transverse to the longitudinal direction and can facilitate the engagement of the respective needle at the fiber bundle skein and particularly the hooking of the at least one fiber bundle skein in the needle hook of the respectively assigned needle.

In a preferred embodiment it is provided that the needle intersects in its extended position or in its retracted position a corridor extending in longitudinal direction that is defined by the path on which a respectively assigned guide passage of the guide device moves. The needle penetrates in the corridor, the cross-section of which is defined by the path. Within this corridor a reliable engagement of the needle at the fiber bundle skein can be carried out. By a subsequent relative movement of the guide device along the path relative to the needle, the fiber bundle skein is led under formation of a kink or a curvature around the needle or the needle hook.

In a preferred embodiment the device further comprises a support unit. The support unit has a support part arranged in the working area and is configured to move the support part between a rest position and a support position. The support part has at least one support opening, wherein the number of support openings corresponds to the number of supply channels and the number of suction channels or the number of fiber bundle skeins. In the initial position the at least one suction channel preferably extends through one respectively assigned support opening. Analog to the guide passages a threading of a fiber bundle skein through the respective support opening can be carried out thereby, if the suction channel is moved in its working position outside of the working area.

It is advantageous, if the plane in which the longitudinal axis of the needle respectively assigned to a fiber bundle skein is present, is arranged substantially centered between the free end of the suction channel that is in the working position and the support opening of the support part that is in the support position. Due to this measure, a fiber bundle loop can be created having legs of substantially equal length.

It is also preferred, if during the movement of the needle with the fiber bundle skein through the carrier part the guide passage is at a location of the path in which the guide passage is substantially arranged in the extension of the longitudinal axis of the needle. Due to this configuration, it can be avoided that the fiber bundle skein cuts into the material of the carrier part during movement through the carrier part and therby enlarges a hole or an opening through the carrier part.

In another preferred embodiment a first separation unit is provided adjacent to the supply channel. By means of the first separation unit, the at least one fiber bundle skein can be cut adjacent to the opening of the supply channel. It is also preferred, if a second separation unit is present. The second separation unit is configured to cut a loop of the fiber bundle extending through the carrier part and formed on one side of the carrier part.

The progress of the method for manufacturing a carrier part with multiple fiber bundles intersecting the carrier part is as follows:

First, the at least one suction channel is moved in the working area and is fluidically connected with a respectively assigned supply channel. Subsequently an airflow is created by means of the suction unit in the at least one suction channel and the supply channel fluidically connected therewith. By means of the fiber bundle conveying unit, a portion of the at least one fiber bundle skein with a defined length is removed from the stock and is conveyed in the respective supply channel and further in the respective suction channel. The at least one fiber bundle skein is engaged by the airflow away from the fiber bundle conveying unit with a suction force and is tensioned so-to-speak.

Subsequently the at least one suction channel is moved out of the working area in the working position. Thus, the at least one fiber bundle skein is at least partly accessible in the working area. In the working position of the suction channel the airflow is maintained for tensioning the at least one fiber bundle skein.

By means of the needle holding unit, the at least one needle is moved between a retracted position and an extended position. During this movement the needle is moved through the carrier part twice. During one of these two movements the needle catches the assigned fiber bundle skein at one location in the working area previously and moves the fiber bundle skein through the carrier part, whereby a loop is formed. Preferably a separation of the fiber bundle skein adjacent to the supply channel is carried out before the movement of the fiber bundle skein through the carrier part.

BRIEF DESCRIPTION OF THE DRAWINGS

Advantageous embodiments of the device and the method yield from the dependent claims, the specification and the drawings. In the following, preferred embodiments are explained in detail with reference to the attached drawings. They show:

DETAILED DESCRIPTION

In FIGS. 1-6 an embodiment of a device 20 for manufacturing a carrier part 21 with multiple fiber bundles 22 is schematically illustrated in the manner of a block diagram. The fiber bundles 22 can protrude with their two end sections from the carrier part 21 and thus extend beyond the upper side and the lower side of the carrier part 21. The direction in which the fiber bundles 22 extend through the carrier part 21 can be orientated orthogonal and/or under an angle inclined relative to the upper side and/or the lower side of the carrier part. In doing so, the fiber bundles 22 can be orientated parallel or can extend in different directions. For example, groups with multiple fiber bundles 22 can be formed, wherein the fiber bundles 22 of different groups extend in different directions and the fiber bundles within the same group are orientated parallel.

Figure 11:
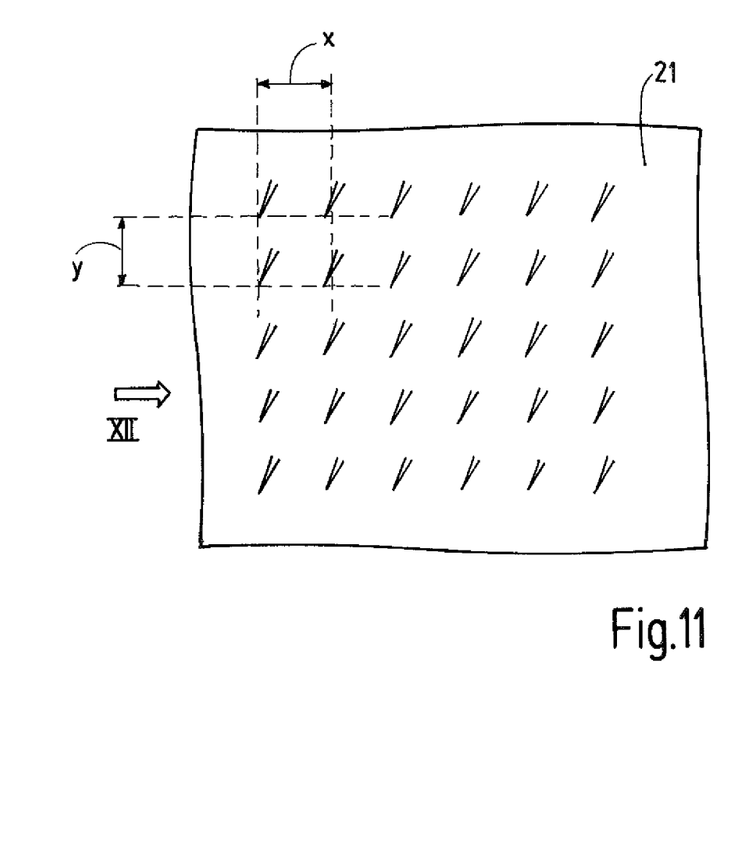
Figure 12:
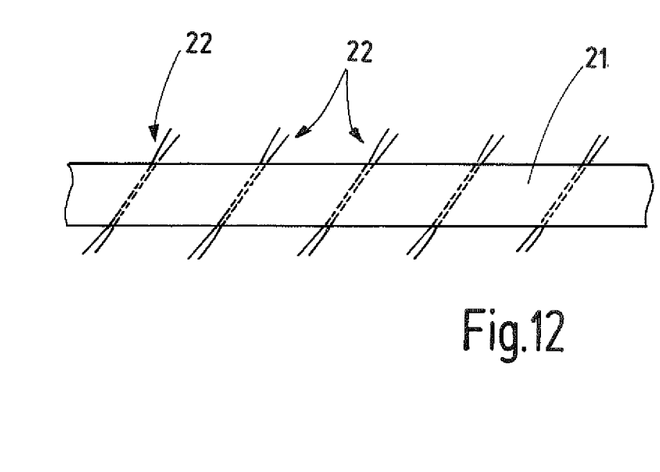

In the embodiment carrier part 21 is formed by a plate and is schematically illustrated in FIGS. 11 and 12. This carrier part 21 provided with fiber bundles 22 serves as semi-finished product during the manufacturing of a composite component. The fiber bundles 22 are preferably made from sections of a roving, e.g. the fiber bundles 22 passing through carrier part 21 can be immersed or infiltrated with a plastic or resin. On the upper side and/or the lower side of the carrier part 21 additional fiber bundles or fiber mats can be arranged and can be immersed with the resin or plastic in order to obtain a fiber-reinforced composite component. As it is apparent in FIGS. 11 and 12, the two end regions of the fiber bundles 22 passing through the carrier part 21 extend from the carrier part and can thus be connected with fiber bundles or fiber mats in a substance bond manner that can be arranged on the upper side or the lower side of the carrier part 21 respectively.

According to the example, the fiber bundles are arranged in a matrix shape in the carrier part and have a distance x in one spatial direction and orthogonal thereto in another spatial direction a distance y. The distances x and y can be equal or can have different values.

The carrier part 21 is particularly a light-weight construction plate, e.g. a plate of foam material.

Figure 1:
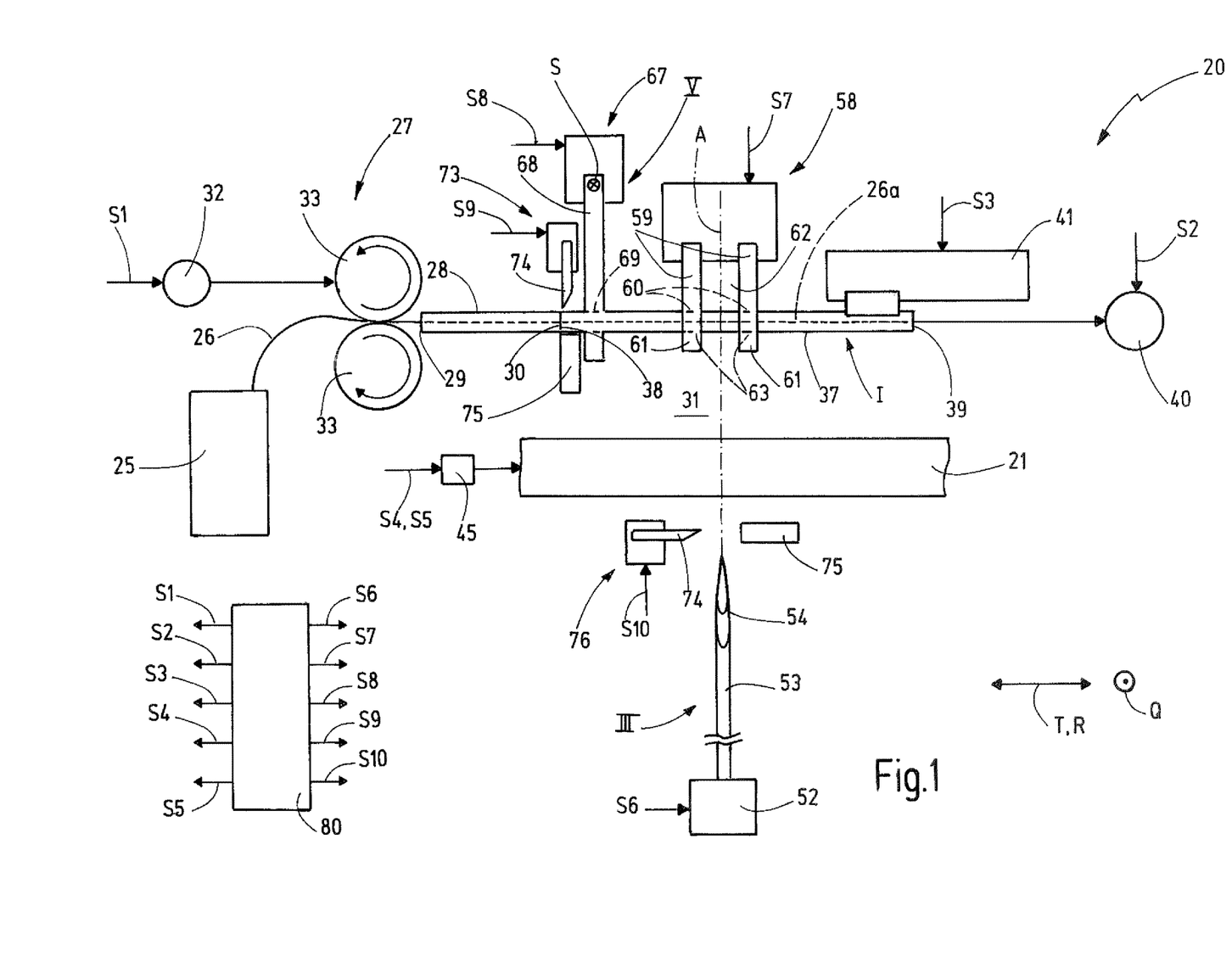
FIGS. 1-6 a schematic block diagram-like embodiment of a device in different situations during manufacturing of a carrier part comprising multiple fiber bundles respectively, FIG. 7 a schematic illustration of the loop formation after pulling of a fiber bundle through the carrier part by the device according to FIGS. 1-6, FIG. 8 a schematic illustration of the separation of the loop formed in FIG. 7, FIGS. 9 and 10 an exemplary illustration of a position of a guide device of the device according to FIGS. 1-6 respectively during a movement along a path relative to the at least one needle of a device, FIG. 11 a schematic partial illustration of a carrier part with the multiple fiber bundles in a top view, FIG. 12 the illustration of the carrier part of FIG. 11 in a side view according to arrow XII, and FIG. 13 a perspective illustration of an embodiment of a guide device and a support device of a device.

Based on FIG. 1, the main construction groups of the device 20 are explained. The device 20 comprises a stock 25 for at least one fiber bundle skein 26. Each fiber bundle skein 26 is, for example, formed by roving with a plurality of filaments. From the at least one fiber bundle skein 26 the fiber bundles 22 are separated by means of the device 20 and are pushed or pulled through carrier part 21.

A fiber bundle conveying unit 27 is configured to remove the at least one fiber bundle skein 26 from the stock 25 and to convey each fiber bundle skein 26 in a separate supply channel 28. Each supply channel 28 can be formed by a tube. The first end 29 of the supply channel 28 is assigned to the fiber bundle conveying unit 27, whereas the opposite second end 30 of the supply channel 28 is assigned to a working area 31 of the device 20. In the embodiment the fiber bundle conveying unit 27 has a controllable first drive 32. The first drive 32 drives a roller arrangement with at least two rollers 33. The at least one fiber bundle skein 26 is held between the two rollers in a force-fit or friction-fit manner and is conveyed via the first end 29 in the supply channel 28. In the embodiment the fiber bundle conveying unit 27 is configured to convey all of the provided fiber bundle skeins 26.

The device 20 comprises at least one suction channel 37. The number of supply channels 28 and the number of suction channels 37 is equal and corresponds to the number of fiber bundle skeins 26 that are to be conveyed. The at least one suction channel 37 has a first end 38 assigned to the respective supply channel 28 and an opposite second end 39. The second end 39 of the at least one suction channel 37 is fluidically connected with a suction unit 40 respectively. The suction unit 40 is configured to create an airflow L in the at least one suction channel 37 that flows from the first end 38 to the second end 39 respectively.

By means of a second drive 41, the at least one suction channel 37 can be moved between an initial position I (illustrated in FIG. 1) and a working position II (illustrated in FIGS. 2-6) and according to the example, can be shifted linearly in a longitudinal direction R. In the initial position I the at least one suction channel 37 is fluidically coupled with the respectively assigned supply channel 28 such that the suction unit 40 creates an underpressure in the supply channel 28. In other words, in the initial position I an airflow L can be created through the at least one supply channel 28 and the at least one suction channel 37 that is fluidically coupled therewith. As it is illustrated in FIG. 1, the at least one suction channel 37 extends in the initial position I into the working area 31. Thereby the first end 38 of each suction channel 37 abuts at or is placed opposite with a small distance to the second end 30 of the assigned supply channel 28.

Figure 2:
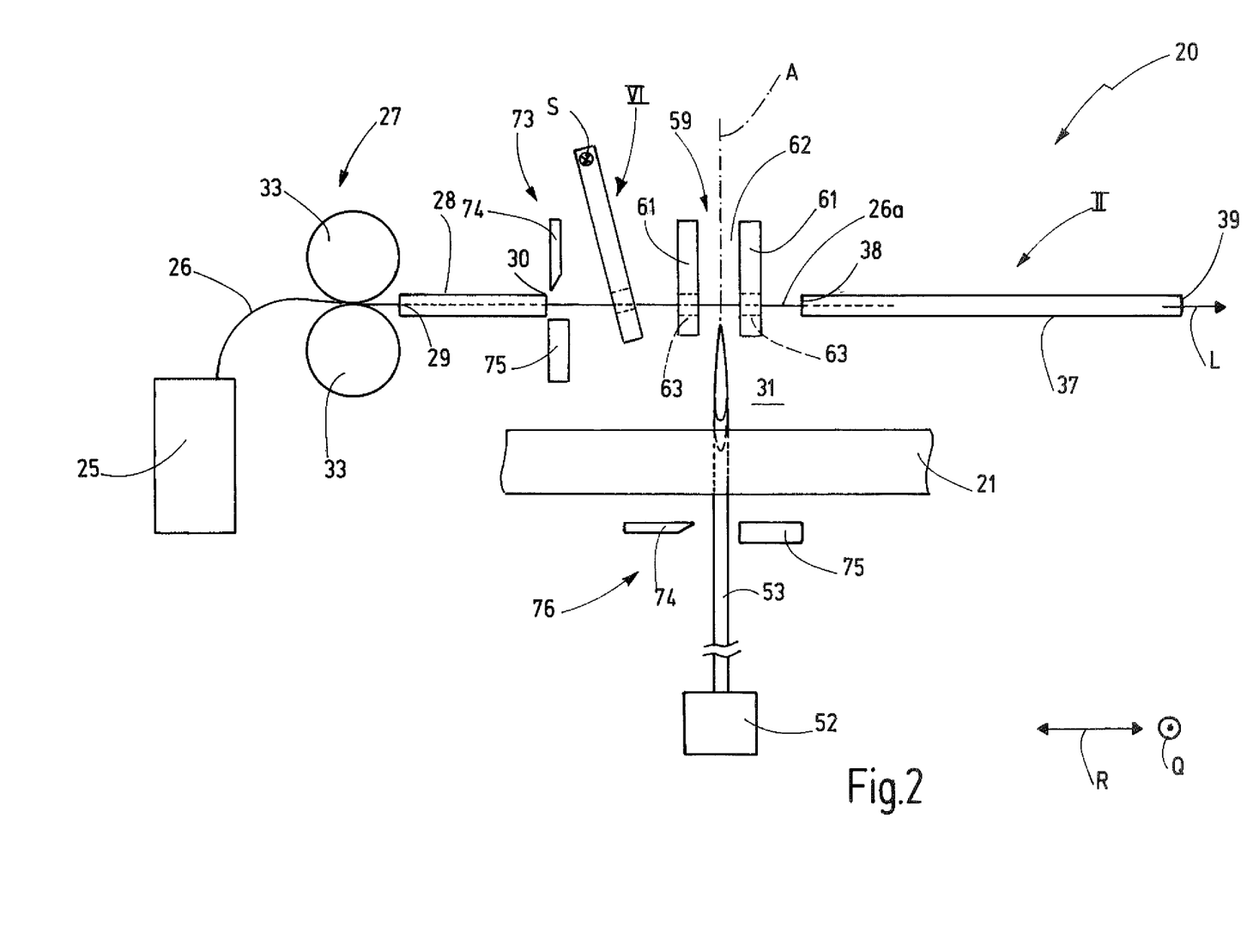

In the working position II the at least one suction channel 37 is arranged outside the working area 31. The second end 30 of the at least one supply channel 28 and the respectively assigned first end 38 of the suction channel 37 are placed opposite each other with distance in longitudinal direction R on opposite sides of the working area 31 (compare FIGS. 2-6). If the at least one suction channel 37 was moved in the initial position I, a defined length of the end section 26a of the at least one fiber bundle skein 26 can be conveyed via the at least one supply channel 28 in the at least one suction channel 37 by the fiber bundle conveying unit 27. This end section 26a is illustrated in dashed lines in FIG. 1. The conveying of the end section 26a of the fiber bundle skein 26 in the respective suction channel 37 is supported by the airflow L created by the suction unit 40. As soon as the fiber bundle conveying unit 27 has conveyed the defined length into the suction channel 37, the fiber bundle conveying unit 27 is stopped and a further supply of the at least one fiber bundle skein 26 is stopped. Under maintenance of the airflow L the at least one suction channel 37 can be moved in the working position II such that the end section 26a of the fiber bundle skein 26 is at least partly freely accessible between the respective supply channel 28 and the respective suction channel 37 that for the time being extends in longitudinal direction R through the working area 31. In doing so, the airflow L provides sufficiently good stretching of the end section 26a of each fiber bundle skein 26. In the working position II a portion of the end section 26a extends in the respectively assigned suction channel 37 (FIG. 2). In order to accelerate the progress, the movement of the suction channel 37 in the working position II can also be already initiated during the conveying of the fiber bundle conveying unit 27. In this approach it has to be guaranteed only that a sufficient length of the fiber bundle skein 26 is located inside the suction channel 37 such that it is guaranteed that the airflow conveys the end section of the fiber bundle skein 26a in a stretched position.

Adjacent to working area 31 a positioning unit 45 is provided. The positioning unit 45 is configured to move the carrier part 21 in a transport direction T that extends parallel to the longitudinal direction R step by step and to position the carrier part 21. The specific configuration of the positioning unit 45 can vary and depends, e.g. from whether the carrier part 21 is a bending-resistant plate or a flexible bendable carrier part 21 such that, for example, a two-dimensional textile fabric, a mat or a web.

At the side of carrier part 21 opposite the working area 31 a needle holding unit 52 is present. The needle holding unit 52 carries at least one needle 53. The number of needles 53 conforms with the number of provided fiber bundle skeins 26. One needle 53 is assigned to each fiber bundle skein 26. Each needle 53 extends along its longitudinal axis A and has a needle hook 54 in the embodiment, in order to engage an assigned end section 26a of the respective fiber bundle skein 26 and to hold it at the needle 53 such that the end section 26a can be pulled through the carrier part 21. The longitudinal axis A of each needle 53 extends through the working area 31 and is, according to the example, arranged in a plane that is orientated orthogonal to the transport direction T or the longitudinal direction R.

Figure 3:
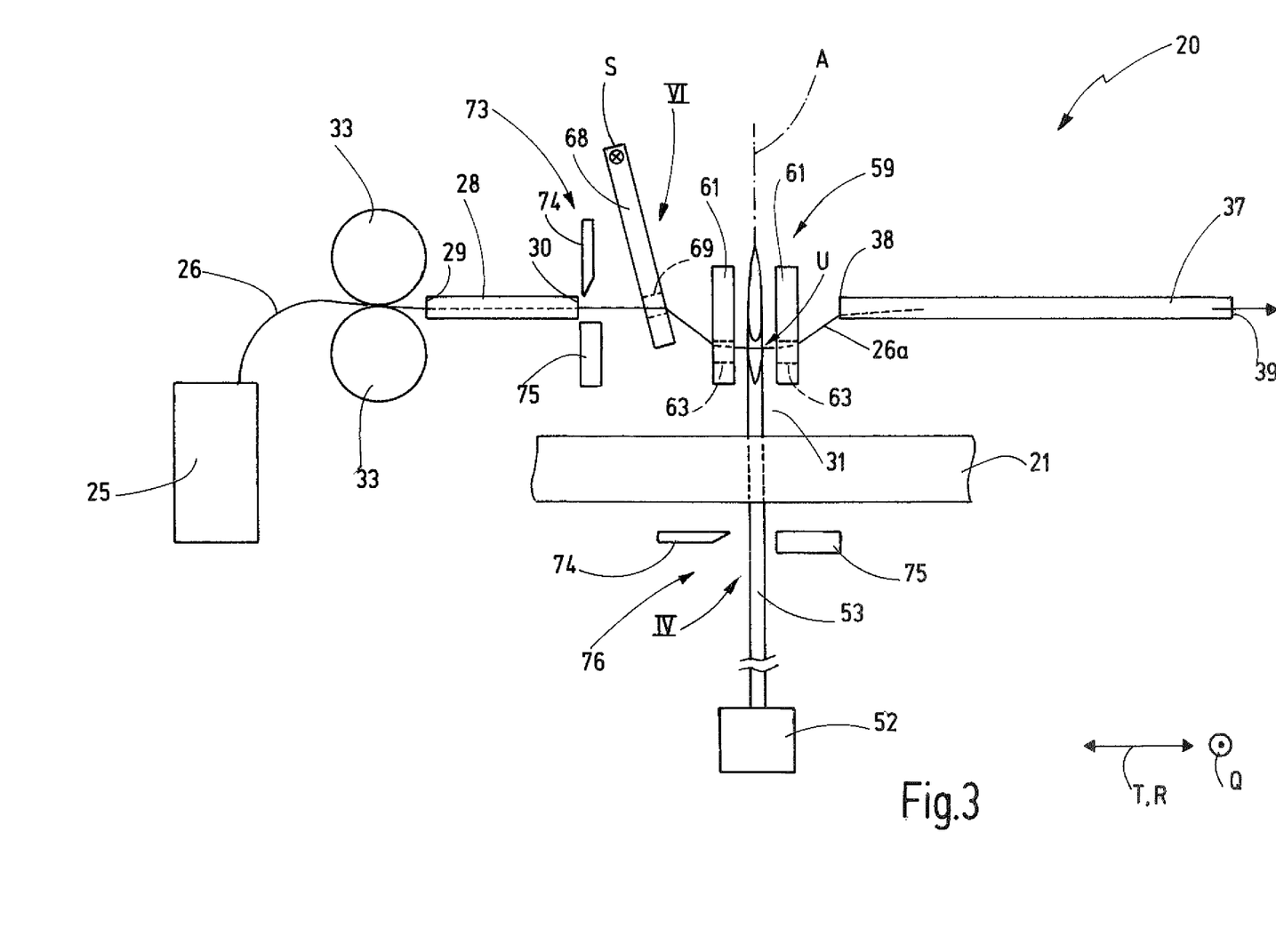

By means of the needle holding unit 52, the at least one needle 53 can be moved along its longitudinal axis A between a retracted position III (FIG. 1) and an extended position IV (FIG. 3). In the extended position IV the needle hook 54 of the needle is located in the working area 31. In the retracted position III the needle is located completely outside of the working area 31 and does not extend through the carrier part 21 or into the carrier part 21. During the movement from the retracted position III in the extended position IV the tip of needle 53 penetrates in carrier part 21 and advances until the extended position IV is reached in the working area 31. During the movement from the extended position IV back into the retracted position III the end section 26a of the fiber bundle skein 26 is pulled through the hole in the carrier part 21 that was formed by penetration of the needle 53.

Figure 9:
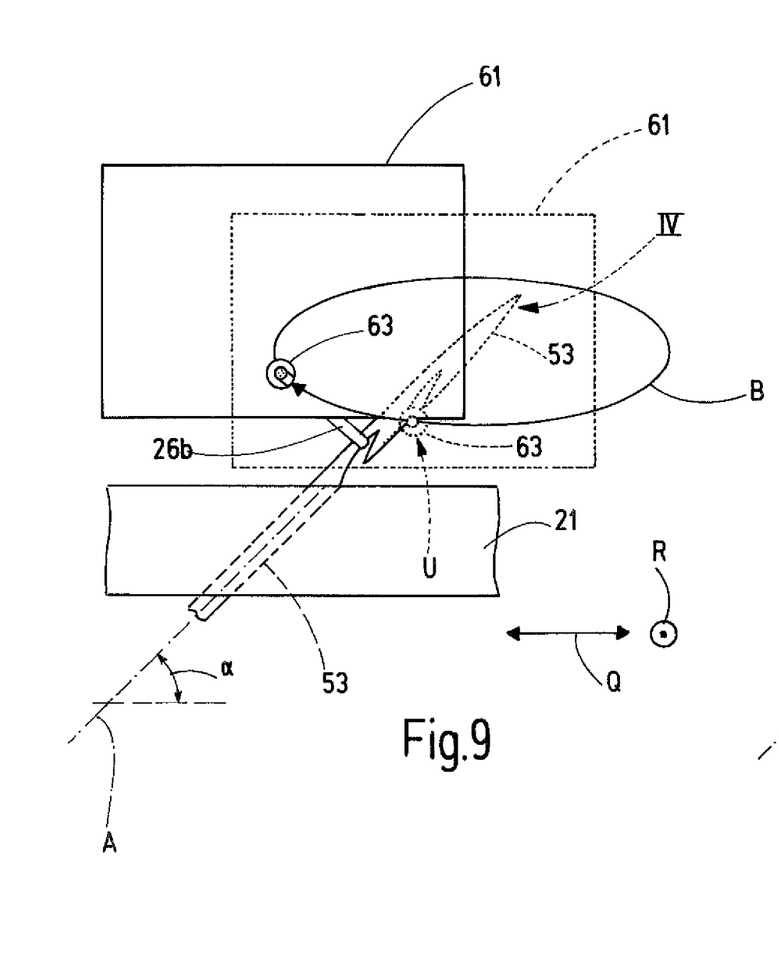
Figure 10:
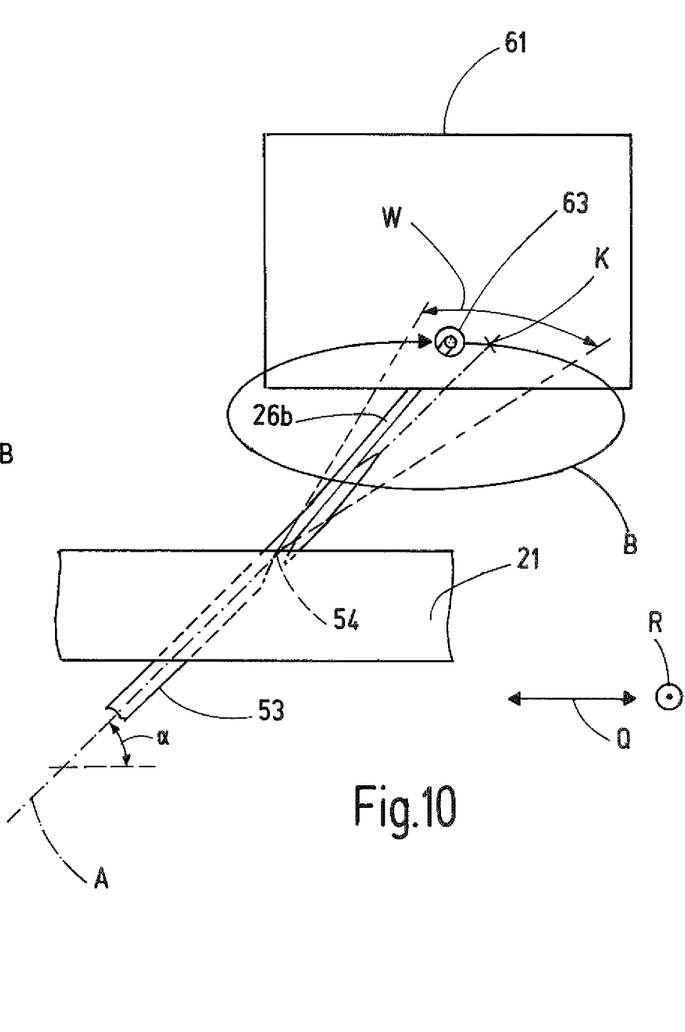

In FIGS. 9 and 10 it is apparent that the longitudinal axis A of each needle 53 is inclined by an inclination angle α relative to a transverse direction Q and within a plane orthogonal to the longitudinal direction R. The inclination angle α can be, e.g. in the range from 15 degrees to 90 degrees. Preferably it is within the range from 30 degrees to 60 degrees.

Device 20 further comprises a guide unit 58 having a guide device 59 arranged in the working area 31. The guide device 59 has a guide passage 60 through which the end section 26a extends in the working area 31. The guide device 59 is movable along a path B (FIGS. 9, 10 and 13) parallel to a plane that is orientated orthogonal to the longitudinal direction R. In doing so, the end section 26a can be deflected in the working area 31 transverse to its initial orientation that extends substantially straight in longitudinal direction R (FIG. 3).

Figure 13:
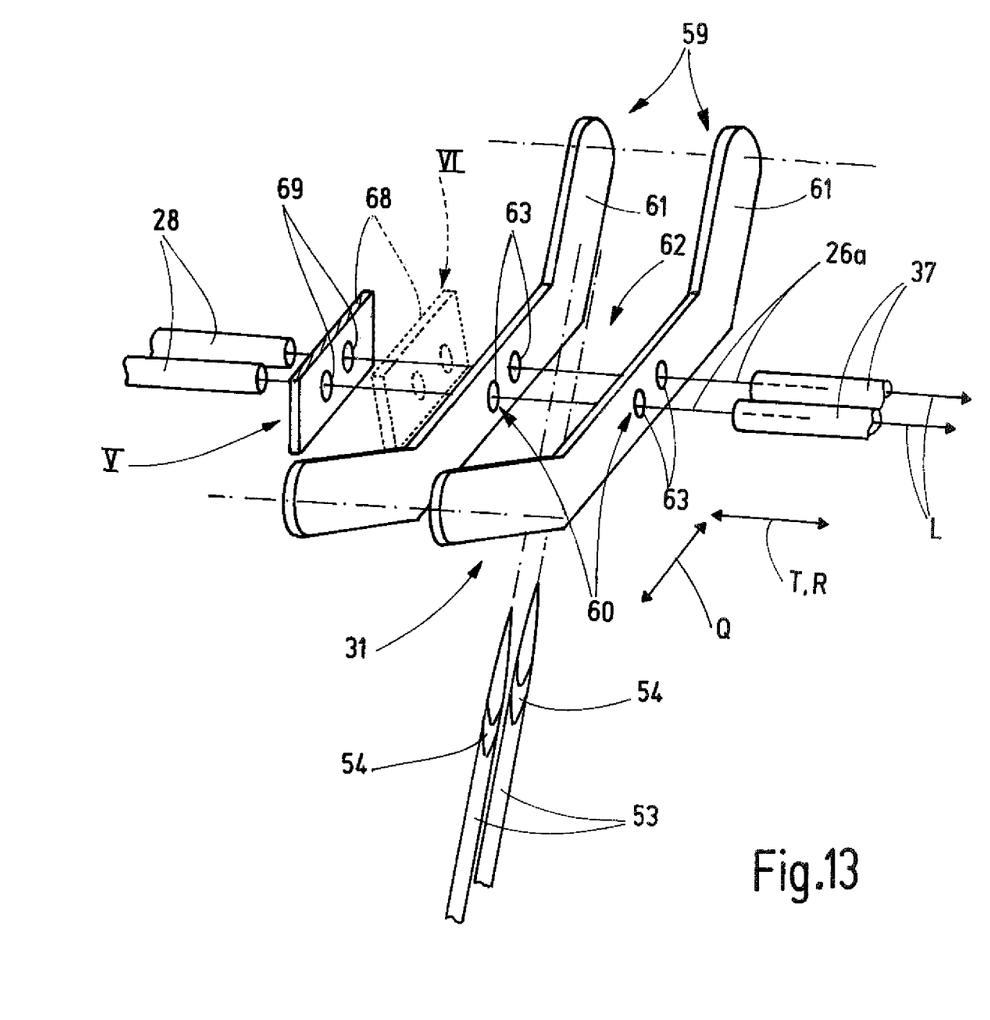

In the embodiment described here the guide device 59 is formed by two guide bodies 61. The guide bodies 61 have a distance to each other in longitudinal direction R and in doing so, limit an interstice 62. The interstice 62 subdivides the at least one guide passage 60 in two guide holes 63. One of the two guide holes 63 of the common guide passage 60 is arranged in each guide body 61. The guide holes 63 of a guide passage 60 are aligned in longitudinal direction R. The two guide bodies 61 are immovably arranged relative to each other. During the movement along the path B the guide bodies 61 move synchronously with each other. An embodiment for the configuration of the guide bodies 61 of a guide device 59 is illustrated in FIG. 13. The guide bodies 61 can be thin as a plate in longitudinal direction R. In the embodiment each guide body 61 is formed by a bracket-shaped plate with a middle leg and two side legs extending obliquely thereto, wherein the at least one guide hole 63 is present in the middle leg. By means of the side legs each guide body 61 can be supported for movement along the path B.

The dimension of the interstice 62 in longitudinal direction R is sufficiently large, such that the at least one needle 53 can engage into the interstice 62. The longitudinal axis A of each present needle 53 thereby preferably extends in a plane that extends centered through the interstice 62 (FIGS. 1-6).

In the preferred embodiment described here the device 20 comprises a support unit 67. The support unit 67 has a support part 68 arranged in the working area 31. At least one support opening 69 extends through the support part 68. The number of support openings 69 corresponds to the number of provided fiber bundle skeins 26. The support unit 67 is configured to move the support parts 68 between a rest position V and a support position VI and according to the example, to pivot it about the pivot axis S. The pivot axis S extends orthogonal to the longitudinal direction R in a transverse direction Q. In FIGS. 1-6 the transverse direction Q extends orthogonal to the drawing plane. If multiple fiber bundle skeins 26 and accordingly multiple supply channels 28, suction channels 37, needles 53, guide passages 60 and support openings 69 are present, they are arranged adjacent to each other in transverse direction Q (FIG. 13). Due to this configuration of the device 20, a small distance of the fiber bundle skeins 26 and the needles 53 in transverse direction Q can be achieved. In doing so, a high density of fiber bundles 22 in the carrier part 21 can be achieved. The transverse direction Q and the at least one longitudinal axis A of the at least one needle 53 extend in a plane parallel to which the guide device 59 is moved along path B and orthogonal to the longitudinal direction R.

Figure 4:
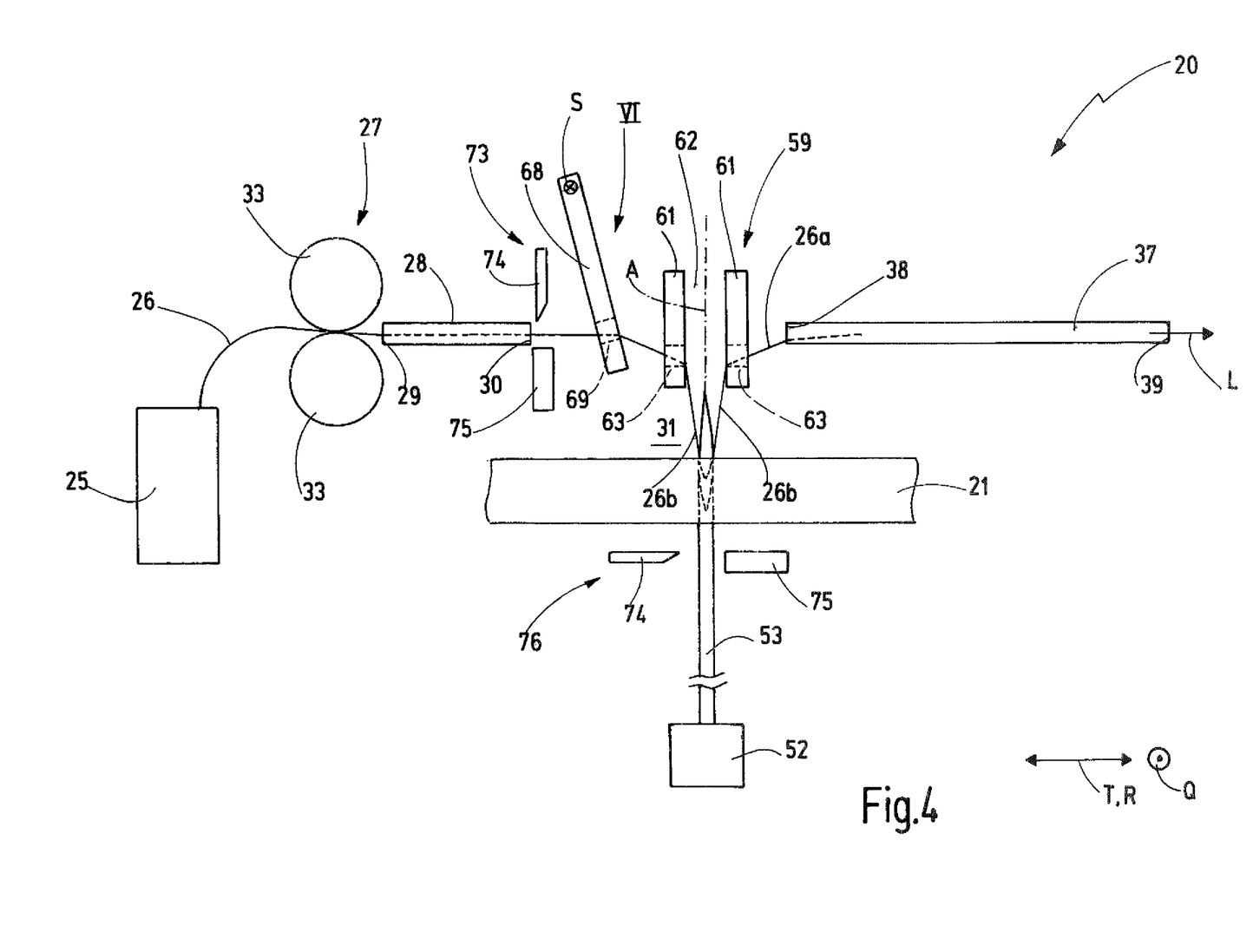
Figure 5:
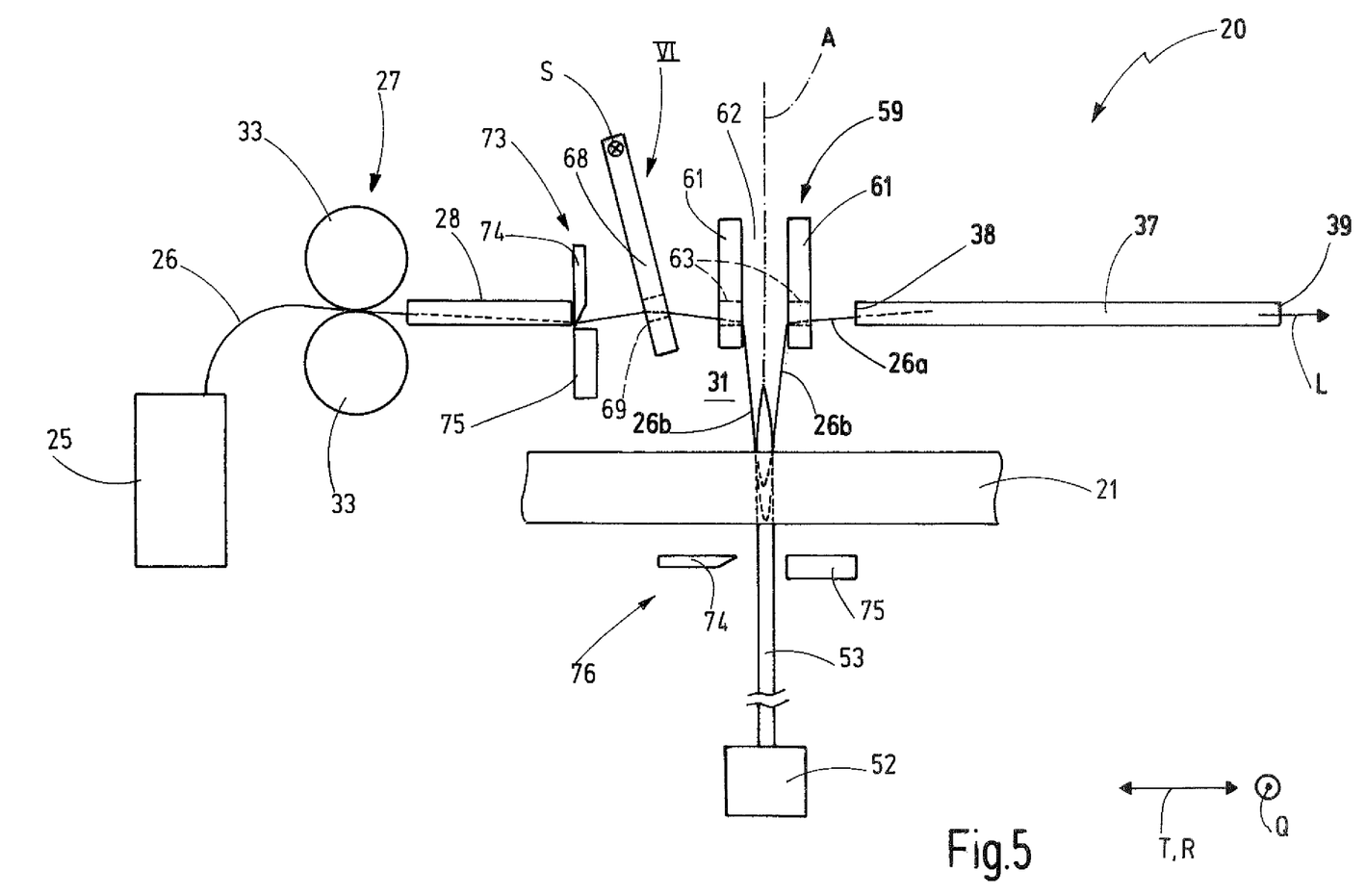
Figure 6:
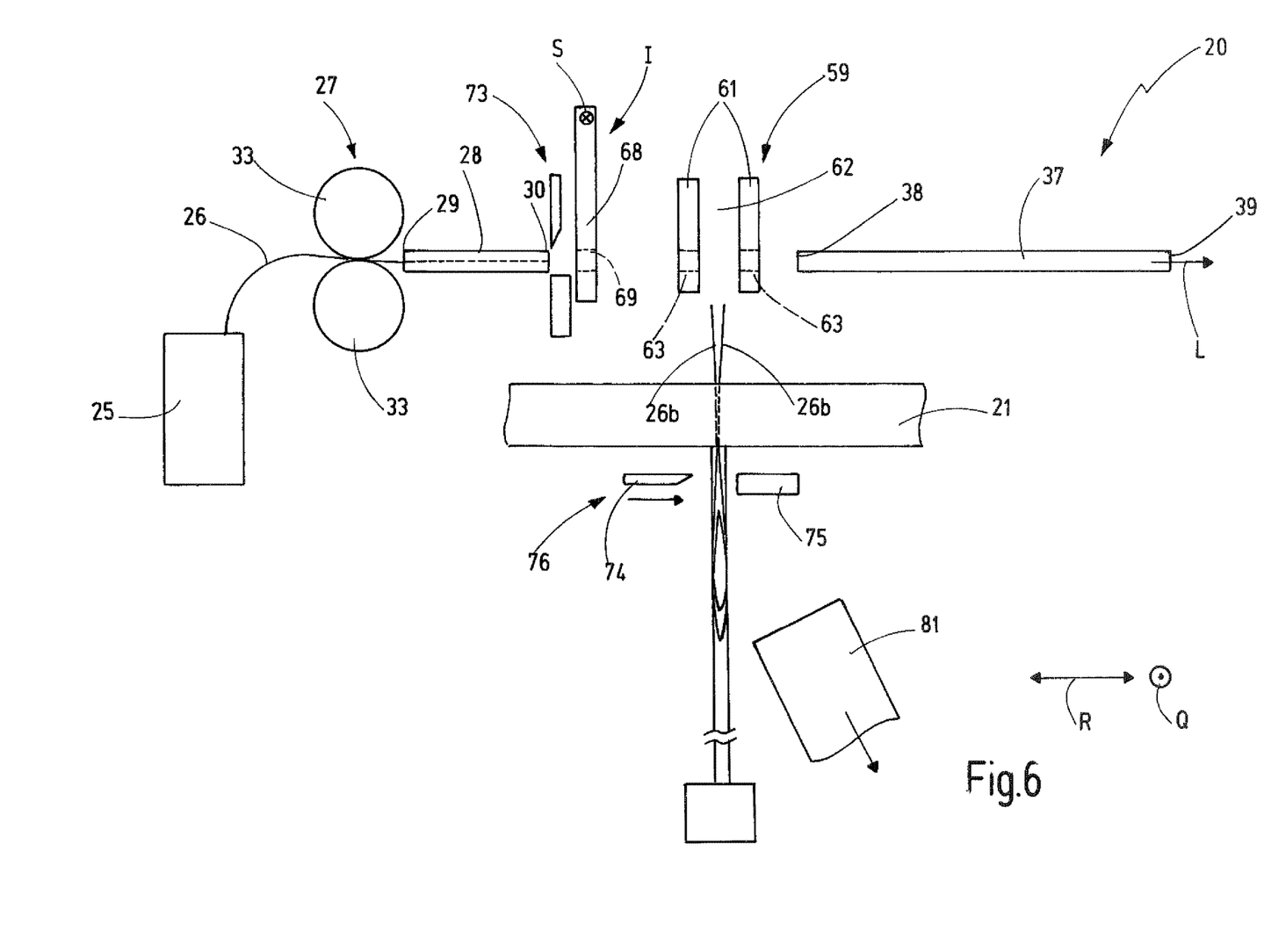

The support part 68 is movable between a rest position V (FIGS. 1, 6 and 13) and a support position VI (FIGS. 2-5 and 13). The support part 68 is, according to the example, arranged between the guide device 59 and the at least one supply channel 28 in the working area 31. In the rest position V the support part 68 is located closer to the at least one supply channel as in the support position VI. In the support position VI a plane extending orthogonal to the longitudinal direction R, in which the at least one longitudinal axis A of the at least one needle 53 extends, is arranged substantially centered between the support part 68 and the at least one suction channel 37. In doing so, a symmetric loop formation during catching of the end section 26a by the at least one needle 53 is improved such that the two legs of the fiber bundle 22 that are pulled through the carrier part 21 are of substantially the same length. In the rest position V the at least one support opening 69 is aligned with the openings of the at least one assigned supply channel 28 and the at least one assigned suction channel 37 (FIGS. 1 and 6). By pivoting, the support part 68 is orientated obliquely to the longitudinal direction R in the support position VI. The at least one support opening 69 is preferably dimensioned such that the end section 26a of the assigned fiber bundle skein 26 could extend linearly from the supply channel 28 through the support opening 69 into the suction channel 37.

Adjacent to the second end 30 of the at least one supply channel 28 a first separation unit 73 is arranged. The first separation unit 73 has at least one blade 74 that is movable orthogonal to the longitudinal direction R for cutting of the at least one fiber bundle skein 26. At the side of the supply channel 28 opposite of the blade 74 a counter tool 75 of the at least one separation unit 73 is arranged that cooperates with blade 74.

In addition, device 20 comprises a second separation unit 76. The second separation unit 76 is arranged in the area of the positioning unit 45. It is located on the side of positioning unit 45 that faces away from the working area 31. The second separation unit 76 comprises analog to the first separation unit 73 a movable blade 74 and a counter tool 75 cooperating with the movable blade 74. According to the example, blade 74 of the second separation unit 76 is movable in longitudinal direction R. The at least one blade 74 and the counter tool 75 of the second separation unit 76 are arranged on opposite sides relative to the longitudinal axis A of the assigned needle 53.

In FIG. 1 a control device 80 of the device 20 is also illustrated. The control device 80 is configured to control the different units and drives of device 20 in a coordinated manner with each other in order to operate device 20 for executing the method. For this the respective control signals are transmitted to the units and drives. According to the example, the control device 80 transmits the following control signals:

a first control signal S1 for the first drive 32 of the fiber bundle conveying unit 27, a second control signal S2 for the suction unit 40, a third control S3 for the second drive 41 for moving the at least one suction channel 39, a fourth control signal S4 and/or a fifth control signal S5 for positioning of the carrier part 21 through the positioning unit 45, a sixth control signal S6 for the needle holding unit 52 for moving the at least one needle 53 along its respective longitudinal axis A between the retracted position III and the extended position IV, a seventh control signal S7 for the guide unit 58 for movement of the guide device 59 along the path B, an eighth control signal S8 for the support unit 67 for movement of the at least one support part 68 between the rest position V and the support position VI, a ninth control signal S9 for actuating the first separation unit 73 and a tenth control signal S10 for actuating the second separation unit 76.

The control device 80 and the respective control units are only illustrated in FIG. 1 and not in FIGS. 2-6 for sake of clarity.

For executing the method for manufacturing a carrier part 21 comprising multiple fiber bundles 22, the device 20 as described above is operated as follows:

By means of the infeed device 45, a carrier part 21 is brought in the desired position relative to the at least one needle 53 such that the needle 53 penetrates through the carrier part 21 at the desired location. The at least one suction channel 37 is brought in its initial position I and via the suction unit 40 an airflow L is created. The fiber bundle conveying unit 27 is operated to convey a defined length of an end section 26a of the at least one fiber bundle skein 26 via the respective supply channel 28 in the suction channel 37 that is fluidically connected therewith. This conveyance is supported by the airflow L such that the end section 26a extends substantially in longitudinal direction R through the supply channel 28 and the suction channel 37 arranged in the initial position I.

Subsequently under maintenance of the creation of the airflow L, the at least one suction channel 37 is moved out of the working area 31 and away from the at least one supply channel 28 until it has reached its working position II (FIG. 2). In doing so, at least a portion of the end section 26a is exposed in the working area 31. A portion of the end section 26a extends in the suction tube 37 also in the working position II of the at least one suction tube 37 and the creation of airflow L is maintained. A further conveyance of the at least one fiber bundle skein 26 is impeded by stopping the fiber bundle conveying unit 27. Due to the suction force or the airflow L, the loose end of the end section 26a is sucked such that the end section 26a is maintained during the further procedure under a certain tensile stress.

The needle holding unit 52 moves the at least one needle 53 out of the retracted position III such that the at least one needle 53 penetrates through carrier part 21 and reaches the working area 31 (FIG. 2). After or before the at least one needle 53 is completely extended along its respective longitudinal axis A and has thus reached the extended position IV the guide device 59 is moved along the path B. The movement along the path is schematically illustrated in FIGS. 9 and 10 based on one of the two guide bodies 61.

The path B is a closed path and can extend, e.g. elliptic, oval, circular or otherwise curved at least in sections. The at least one needle 53 engages with the needle hook 54 in the interstice 62 between the two guide bodies 61. At a transfer location U of path B the needle hook 54 is located at a position within a corridor extending in longitudinal direction R, the cross-section of which is defined by the path B of the guide holes 63. The portion of the end section 26a that extends between the guide holes 63 through the interstice 62 moves along path B and gets into contact with the assigned needle 53 at the transfer location U. At this point of time the needle hook 54 is located within the corridor or at the transfer location U (dotted illustration in FIG. 9). Beginning at the transfer location U, the path B extends obliquely or transverse away from the longitudinal axis A of the respective needle 53. In doing so, the portion of the end section 26a extending through the interstice 62 is guided around the needle 53 so-to-speak and forms two legs 62b that extend from the needle 53 to one of the guide holes respectively (FIGS. 4 and 5). The legs 26b are so-to-say arranged in a U-shaped manner or V-shaped manner around needle 53 and enclose an acute angle. In doing so, the end section 26a can be reliably caught or retained by the needle hook 54. The needle holding unit 52 executes the retraction movement from the extended position IV synchronized with the position of the guide device or the guide bodies 61 along path B (FIG. 9). Before or at the beginning of the retraction movement of the at least one needle 53 from the extended position IV the support part 68 is moved in its support position VI (FIG. 3).

The retraction movement of the at least one needle 53 is continued and concurrently the guide device 59 moves further along the path B. At the moment in which the needle hook 54 reaches the carrier part 21 and pulls the end section 26a of the fiber bundle skein 26 in the carrier part 21, the guide passage 60 or the guide holes 63 are located at a position of path B substantially in extension to the longitudinal axis A with view in longitudinal direction R (FIG. 10). A straight line that connects the ends of the legs 26b abutting at the guide holes 63 is located within a tolerance or angle range W about an intersection location K at the point of time at which the needle hook 54 or the end section 26a of the fiber bundle skein 26 penetrates into the carrier part 21 (FIG. 10). The intersection location K is the location of the corridor defined by path B, at which the longitudinal axis A intersects the corridor, wherein preferably the intersection point is used as intersection location K that is further away from the carrier part 21 or the needle 53. In an ideal case the guide passage 60 or the guide holes 63 are located at the intersection location K when the needle hook 54 or the end section 26a of the fiber bundle skein 26 penetrates into the carrier part 21. Then the two legs 26b of the end section 26a extend relative to a plane orientated orthogonal to the transverse direction Q substantially parallel to the longitudinal axis A of the needle 53 (FIG. 10). In so doing, it is avoided that the legs of the end section 26a cut and thus expand the hole created by needle 53 in the carrier part 21. As long as the guide passage 60 or the guide holes 63 are within the tolerance or angle range W of the path B, a sufficiently small deviation of the extension of the legs 26b of the end section 26a relative to the longitudinal axis A of needle 53 is achieved and the pulling of the legs of the end section 26a of the fiber bundle skein 26 is facilitated. The tolerance or angle range W can have a maximum amount of 10 degrees or 15 degrees or 20 degrees starting from the exit location of the needle 53 out of the carrier part 21 in a plane rectangular to the longitudinal direction R. This tolerance or angle range W can extend symmetrically or asymmetrically with regard to the longitudinal axis A about the intersection location K.

At the beginning or during the retraction movement of the at least one needle 53 from the extended position IV in the retracted position III, the first separation unit 73 is actuated and separates the end section 26a of the fiber bundle skein 26 adjacent to the second end 30 of the at least one supply channel 28. The cutting off is schematically illustrated in FIG. 5 to a point of time after the needle hook 54 has penetrated the carrier part 21. When this position is reached, a retraction movement of needle 53 can be stopped and the needle 53 first remains in this position that is an intermediate position. In so doing, it is guaranteed that the legs 26b of the fiber bundle skein 26 that particularly are of equal length are retained or fixed in the carrier part. In one embodiment the cutting off of the fiber bundle skein by means of the first separation unit 73 is carried out only after the needle has reached the intermediate position. Then the same length of the legs 26b is maintained during a continued movement of the needle 53 from the intermediate position in the retracted position III. The cutting off can be carried out alternatively also to an earlier point of time of the retraction movement of the at least one needle 53.

During the movement of needle 53 out of the extended position IV in the intermediate position a relative movement of the end section 26a of the fiber bundle skein 26 in its extension direction relative to the needle hook 54 occurs. In doing so, the contact location between the end section 26a of the fiber bundle skein 26 and the needle hook 54 along the end section 26a is shifted. In one embodiment this relative movement can be avoided for protection of the fiber bundle skein 26. This can be achieved in that the first drive 32 is actuated by the first control signal S1 such that exactly as much as additional length of the end section 26a is conveyed as is necessary for the loop formation during the movement of needle 53 from the extended position IV in the intermediate position. The additional required length can be equal to the way that the needle hook 54 travels from the extended position IV in the intermediate position.

FIG. 6 illustrates how the separated end section 26a or the two legs 26b are pulled through the carrier part 21 under formation of a loop. After formation of the loop, the second separation unit 76 is actuated in order to separate the loop and thus the two legs 26b of the end section 26a pulled through the carrier part 21 from each other in order to create the fiber bundle 22. This situation is illustrated in FIG. 6 schematically by the arrow at the blade 74 of the second separation unit 76.

Figure 7:
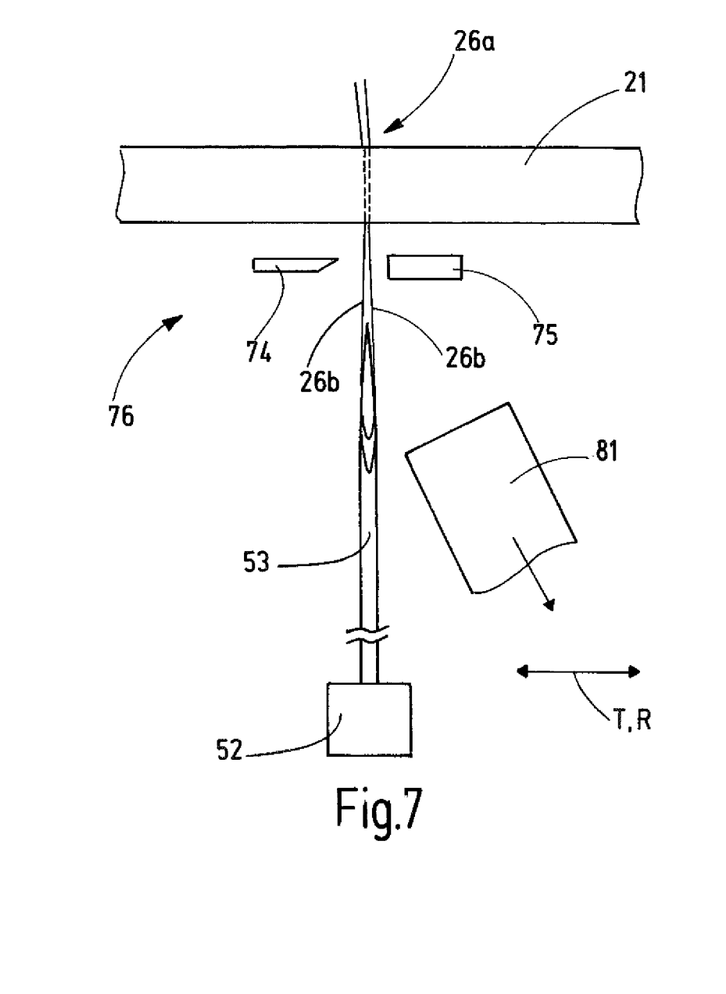
Figure 8:
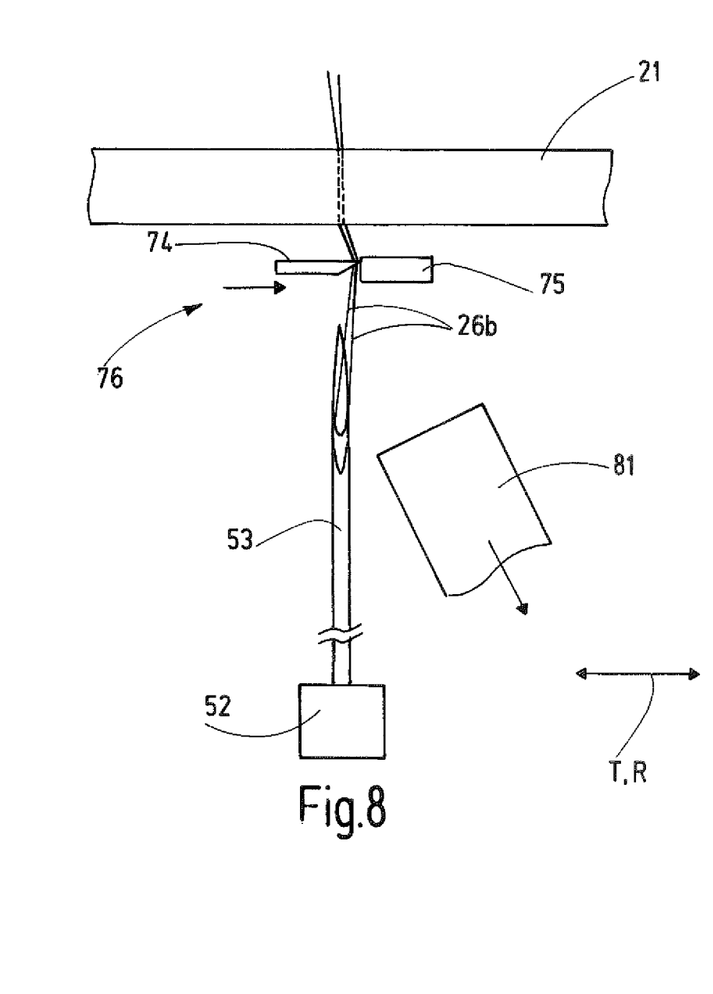

Based on FIGS. 7 and 8 a preferred progress during separation of the loop formed between legs 26b by the second separation unit 76 is explained. After the needle holding unit 52 has pulled the at least one needle 53 completely through carrier part 21, the legs 26b are cut off.

During activation of the second separation unit 76 the blade 74 presses the two legs 26b of the end section 26a transverse toward the counter tool 75 first, until the two legs 26b are cut off between blade 74 and the counter tool 75 (FIG. 8).

As it is schematically illustrated in FIG. 6-8, in the region of the second separation unit 76 a suction device 81 can be present. The loop cut off by the second separation unit 76 can be extracted by suction by means of the suction device 81.

The invention refers to device 20 and a method for manufacturing a carrier part 21 comprising multiple fiber bundles 22. At least one fiber bundle skein 26 is removed from a stock 25 by means of a fiber bundle conveying unit 27 and is conveyed into a respectively assigned supply channel 28. A suction channel 37 is assigned to supply channel 28 that is fluidically connected with the respectively assigned supply channel 28 in an initial position I. By means of a suction unit 40, an airflow L is created in the suction channel 37 away from the supply channel 28 and an end section 26a of the at least one fiber bundle skein 26 is conveyed in the suction channel supported by the suction force. By movement of the at least one suction channel 37 in a working position II, at least one portion of the end section 26a of the at least one fiber bundle skein 26 is exposed in a working area 31 of the device 20. A needle holding unit 52 with at least one needle 53 can catch the at least one end section 26a in the working area 31 and can pull or push it through the carrier part 21 during movement of the at least one needle 53 through the carrier part 21.

LIST OF REFERENCE SIGNS 20 device
21 carrier part
22 fiber bundle composite component
25 stock
26 fiber bundle skein
26a end section of the fiber bundle skein
26b leg of the end section of the fiber bundle skein
27 fiber bundle conveying unit
28 supply channel
29 first end of the supply channel
30 second end of the supply channel
31 working area
32 first drive
33 roller
37 suction channel
38 first end of the suction channel
39 second end of the suction channel
40 suction unit
41 second drive
45 positioning unit
52 needle holding device
53 needle
54 needle hook
58 guide unit
59 guide device
60 guide passage
61 guide body
62 interstice
63 guide hole
67 support unit
68 support part
69 support opening
73 first separation unit
74 blade
75 counter tool
76 second separation unit
80 control device
81 suction device
I initial position
II working position
III retracted position
IV extended position
V rest position
VI support position
α inclination angle
A longitudinal axis of the needle
B path
K intersection location
L airflow
Q transverse direction
R longitudinal direction
S pivot axis
S1 first control signal
S2 second control signal
S3 third control signal
S4 fourth control signal
S5 fifth control signal
S6 sixth control signal
S7 seventh control signal
S8 eighth control signal
S9 ninth control signal
S10 tenth control signal
T transport direction
U transfer location
W tolerance or angle range
x distance of the fiber bundle in a spatial direction
y distance of the fiber bundle in another spatial direction

The invention claimed is:

1. A device (20) for manufacturing a carrier part (21) comprising multiple fiber bundles (22), the device comprising:
a fiber bundle conveying unit (27) that is configured to remove at least one fiber bundle skein (26) from a stock (25) and to convey the at least one fiber bundle skein into a respectively assigned supply channel (28),
at least one suction channel (37) that is movable between an initial position (I) and a working position (II), wherein the at least one suction channel (37) is arranged within a working area (31) and fluidically connected with a supply channel (28) respectively in the initial position (I) and is arranged distant from the supply channel (28) and outside the working area (31) in a working position (II),
a suction unit (40) that is fluidically connected with the at least one suction channel (37) and is configured to create an airflow (L) in the at least one suction channel (37) in order to insert an end section (26a) of the at least one fiber bundle skein (26) from the assigned supply channel (28) by support of the airflow (L) and to apply a suction force on the end section (26a) of the at least one fiber bundle skein (26) that is present in the at least one suction channel (37) in the working position (II),
at least one needle (53) arranged at a needle holding unit (52), the at least one needle comprising a needle hook (54), wherein the needle holding unit (52) is configured to move the at least one needle (53) between a retracted position (III) and an extended position (IV) in order to engage with the needle hook (54) of the at least one needle (53) at a respectively assigned at least one fiber bundle skein (26) exposed in the working position (II) of the at least one suction channel (37) in the working area (31) and extending in a longitudinal direction (R)

and to move the at least one fiber bundle skein through the carrier part (21) by the at least one needle (53).

2. The device according to claim 1, wherein a positioning unit (45) is present and configured to move and/or position the carrier part (21) in a transport direction (T).

3. The device according to claim 2, wherein the positioning unit (45) is arranged between the working area (31) and the needle holding unit (52).

4. The device according to claim 1, wherein the fiber bundle conveying unit (27) is configured to convey a predefined length of the at least one fiber bundle skein (26) via the assigned supply channel (28) in the respective at least one suction channel (37) fluidically connected therewith in the initial position (I) of the at least one suction channel (37).

5. The device according to claim 1, further comprising a guide unit (58) that comprises a guide device (59) arranged in the working area (31) for guiding the at least one end section (26a) of the at least one fiber bundle skein (26), the guide device (29) comprising a separate guide passage (60) for each end section (26a) of the at least one fiber bundle skein (26).

6. The device according to claim 5, wherein the at least one suction channel (37) extends in its initial position (I) through a guide passage (60) of the guide device (59).

7. The device according to claim 5, wherein the guide device (59) comprises two guide bodies (61) that are arranged at a distance from one another in the longitudinal direction (R) under formation of an interstice (62), wherein the at least one guide passage (60) is formed by two aligned guide holes (63), wherein each guide hole (63) of a common guide passage (60) is arranged in one of the two guide bodies (61).

8. The device according to claim 5, wherein the guide unit (58) is configured to move the guide passage (60) of the guide device (59) along a predefined path (B) parallel to a plane that is oriented orthogonally with respect to the longitudinal direction (R).

9. The device according to claim 8, wherein the predefined path (B) is a closed and at least partially curved path (B).

10. The device according to claim 8, wherein the needle holding unit (52) is configured such that the at least one needle (53) intersects a corridor in its extended position (IV) or its retracted position (III) that is defined by the predefined path (B) and that extends in the longitudinal direction (R).

11. The device according to claim 1, further comprising a support unit (67) configured to move a support part (68) arranged in the working area (31) between a rest position (V) and a support position (VI), wherein the support part (68) comprises a support opening (69) for each end section (26a) of the at least one fiber bundle skein (26) respectively.

12. The device according to claim 11, wherein the at least one suction channel (37) extends in its initial position (I) through one respective support opening (69).

13. The device according to claim 11, wherein the support opening (69) of the support part (68) comprises in the support position (VI) substantially a same distance to a plane, in which the needle holding unit (52) moves the respectively assigned needle (53), as the respectively assigned suction channel (37) that is in the working position (II).

14. The device according to claim 1, further comprising a first separation unit (73) adjacent to the supply channel (28) configured to cut off the end section (26a) of the at least one fiber bundle skein (26).

15. The device according to claim 1, further comprising a second separation unit (76) configured to separate a loop of the end section (26a) of the at least one fiber bundle skein (26) moved through the carrier part (21) by the at least one needle (53).

16. A method for manufacturing a carrier part (21) comprising multiple fiber bundles (22) by using a device (20) comprising a stock (25) with at least one fiber bundle skein (26), a fiber bundle conveying unit (27) for the at least one fiber bundle skein (26), at least one supply channel (28), at least one suction channel (37), a suction unit (40) that is fluidically connected with the at least one suction channel (37) and at least one needle (53) arranged at a needle holding unit (52) and respectively comprising a needle hook (54), the method comprising the following steps:

moving the at least one suction channel (37) to an initial position (I) in a working area (31), wherein the at least one suction channel (37) is fluidically connected with the at least one supply channel (28), creating an airflow (L) in the at least one suction channel (37) by the suction unit (40) in order to suck an end section (26a) of the at least one fiber bundle skein (26) that is present in the at least one supply channel (28) by support of the airflow (L), conveying a predefined length of the end section (26a) of the at least one fiber bundle skein (26) via the at least one supply channel (28) in the at least one suction channel (37) fluidically connected therewith by the fiber bundle conveying unit (27), moving the at least one suction channel (37) out of the working area (31) to a working position (II) distant from the at least one supply channel (28), wherein the airflow (L) in the at least one suction channel (37) is maintained in the working position (II), and moving the at least one needle (53) between a retracted position (III) and an extended position (IV) in order to engage the end section (26a) of the at least one fiber bundle skein (26) exposed in the working position (II) of the suction channel (37) in the working area (31) and extending in the longitudinal direction (R) with the needle hook (54) of the at least one needle and moving the end section (26a) by the needle (53) through the carrier part (21).

* * * * *